United States Patent

Runge

[11] 4,326,686
[45] Apr. 27, 1982

[54] FAN JET ENGINE BYPASS AIR DELIVERY SYSTEM FOR BLOWN WING AIRCRAFT LIFT AUGMENTATION DEVICE

[76] Inventor: Thomas M. Runge, 2501 Galewood Pl., Austin, Tex. 78703

[21] Appl. No.: 118,999

[22] Filed: Feb. 15, 1980

[51] Int. Cl.³ .............................................. B64C 21/04
[52] U.S. Cl. ................................ 244/207; 244/23 D; 244/110 B; 239/265.27; 239/265.43; 60/226 R; 60/262
[58] Field of Search .................. 244/12.5, 12.3, 23 D, 244/207, 213, 215, 90 A, 110 B; 239/265.25, 265.27, 265.29, 265.43, 265.41; 60/226 R, 226 A, 262

[56] References Cited

U.S. PATENT DOCUMENTS

| | | | |
|---|---|---|---|
| 1,910,098 | 5/1933 | Ellis | 244/12.5 |
| 2,174,542 | 10/1939 | Weick | 244/90 A |
| 3,280,560 | 10/1966 | Marchant et al. | 244/12.5 |
| 3,330,115 | 7/1967 | Markowski | 60/226 A |
| 3,854,286 | 12/1974 | Klees | 239/265.29 |
| 3,893,638 | 7/1975 | Kelley | 244/207 |
| 4,205,813 | 6/1980 | Evans et al. | 244/12.5 |

FOREIGN PATENT DOCUMENTS

| | | | |
|---|---|---|---|
| 1272135 | 7/1968 | Fed. Rep. of Germany | 60/226 R |
| 360907 | 4/1962 | Switzerland | 244/213 |

*Primary Examiner*—Galen L. Barefoot
*Attorney, Agent, or Firm*—B. P. Fishburne, Jr.

[57] ABSTRACT

Comparatively cool fan bypass air in the annular space surrounding the air compressor of a fan jet engine is diverted near the front of the engine into a duct leading to right and left hand aircraft wing leading edge ducts which in turn deliver the bypass air to a wing blowing device to augment wing lift. All of the fan-generated bypass air can be positively forced into the common duct or manifold by operation of a guided flexible metal strip of sufficient length to form a concave helical diverter vane extending for one complete turn in the annular bypass air engine space when activated by a power control mechanism. Fixed coacting guides shape the normally flat metal strip into the proper cross sectional configuration when the strip is driven to its active bypass air diverting position.

3 Claims, 9 Drawing Figures

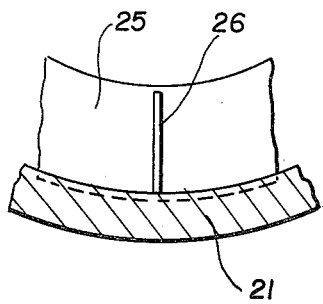
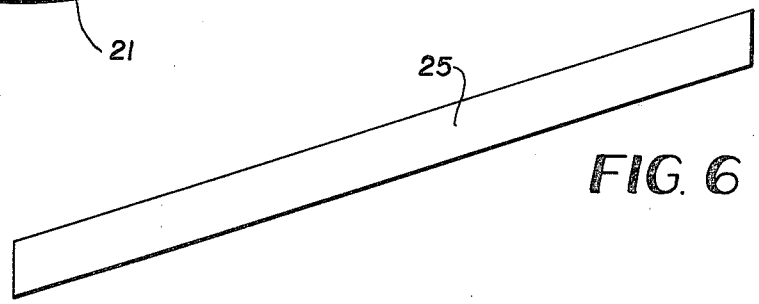
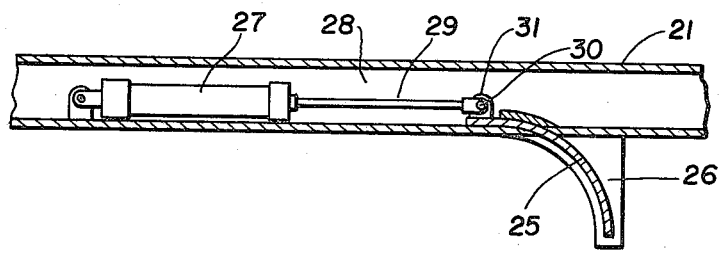
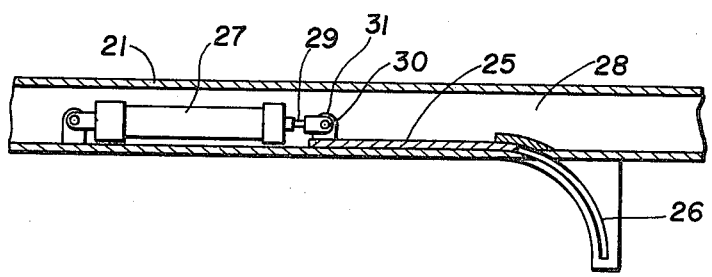
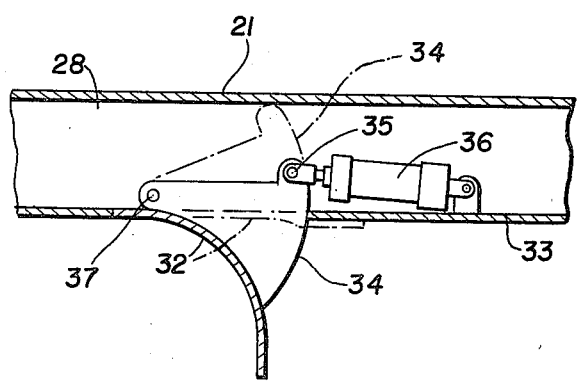

FAN JET ENGINE BYPASS AIR DELIVERY SYSTEM FOR BLOWN WING AIRCRAFT LIFT AUGMENTATION DEVICE

BACKGROUND OF THE INVENTION

U.S. Pat. No. 4,117,995, issued Oct. 3, 1978, discloses an aircraft wing lift augmentation device including oval wing leading edge ducts for delivering air diverted from a jet engine or engines over the dorsal wing surface in cooperation with a profiled wing slat and attached air diffusing gridwork which produces laminar flow of air across the top of the wing.

The present invention relates to a fan jet engine bypass air delivery system for use with the blown wing arrangement in the referenced prior patent, although capable of use with other blown wing or wing lift augmentation arrangements.

Among the important objectives of the invention are to utilize relatively cool fan bypass air taken from the annular space surrounding the engine air compressor near the forward end of the engine, thereby eliminating or substantially reducing the amount of titanium structural material in the operational system. The bleeding off of bypass air near the forward end of the compressor also has the advantage of simplifying the positioning of the jet engine in relation to the aircraft wing.

In accordance with the present invention, a positively controlled and guided metallic strip element is normally retracted inside of the exterior engine shell so as not to impede the flow of fan bypass air through the engine. Whenever blown wing activity to augment wing lift is required, the strip element which is flexible is forced into the fan bypass annular space and simultaneously shaped by a series of fixed guides into a concave single convolution spiral diverter, by means of which all of the fan bypass air can be channeled through a common duct to the right and left hand leading edge wing ducts of the wing lift augmentation device in said prior patent.

BRIEF DESCRIPTION OF THE DRAWINGS

FIG. 5 is an enlarged fragmentary vertical section taken on line 5—5 of FIG. 3.

FIG. 6 is a plan view of a bypass air diverter strip in its normal flat or relaxed state.

FIG. 7 is a fragmentary vertical cross section taken through the outer shell of the engine and showing helical bypass air diverter means in the active or extended position.

FIG. 8 is a similar view showing the diverter means inactive or retracted.

FIG. 9 is a similar view showing a modified form of diverter means and operator.

DETAILED DESCRIPTION

Figure 1:
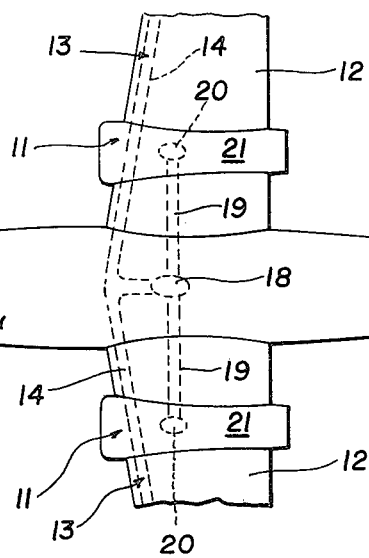
FIG. 1 is a partly schematic fragmentary plan view of an aircraft having a jet engine bypass air delivery system in accordance with the present invention.
Figure 2:
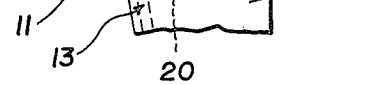
FIG. 2 is a fragmentary perspective view of an aircraft wing utilizing the bypass air delivery system.
Figure 4:
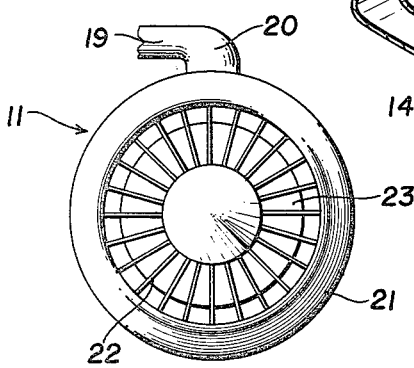
FIG. 4 is an end elevation of the engine in FIG. 3.

Referring to the drawings in detail wherein like numerals designate like parts, the numeral 10 designates a fixed wing aircraft having a pair of conventional fan jet engines 11 attached to the wings 12 of the craft in a conventional manner. The wings 12 are each provided with leading edge lift augmentation means 13 in accordance with the disclosure of U.S. Pat. No. 4,117,995. This means 13 on each aircraft wing 12 comprises an oval blowing air wing duct 14 having an arcuate outlet slit 15 for directing air under a vertically shiftable wing slat 16 to elevate same relative to the dorsal wing surface along with an attached gridwork 17 which produces a laminar flow of blowing air rearwardly over the top surface of each wing, as fully explained in U.S. Pat. No. 4,117,995.

In conjunction with this wing lift augmentation means, the present invention provides centrally in the aircraft a common bypass air delivery duct 18 connected into each wing duct 14 for the purpose of supplying each duct 14 with an equal amount of fan bypass air from each engine 11 at desired times. A branch duct 19 leads from a bleed-off elbow or conduit 20 of each jet engine 11 and the two branch ducts 19 are connected into the common delivery duct 18, as shown in FIG. 1, such common mixing being in accordance with the present state of the art.

Figure 3:
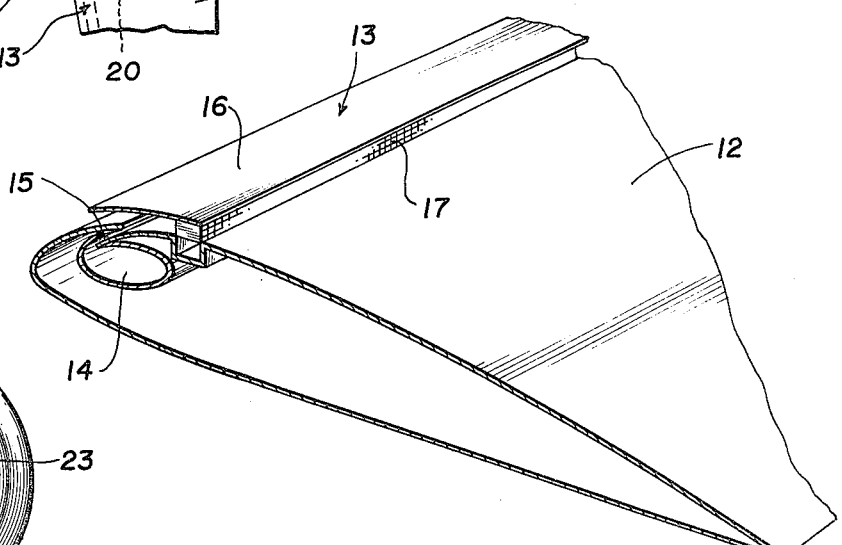
FIG. 3 is a partly schematic central vertical cross section through a fan jet aircraft engine equipped with the bypass air delivery system of the present invention.
Figure 3:
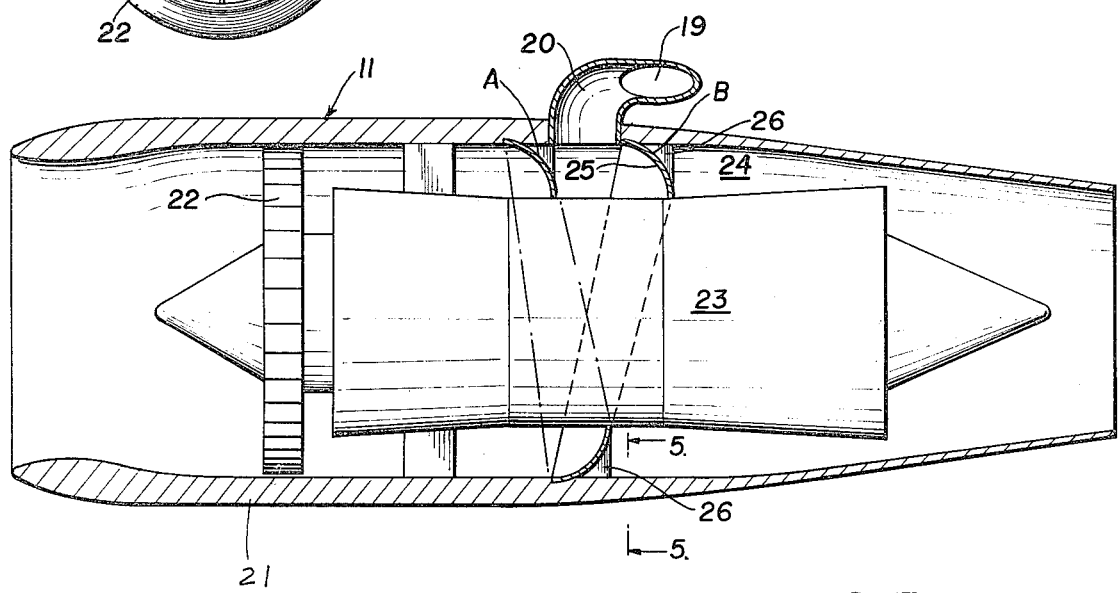

Referring to FIG. 3, the fan jet engine 11 includes an outer shell 21 having spaced walls as shown in FIGS. 6 through 8. A bladed fan 22 of each engine forces air rearwardly through a housing 23 of the engine multistage air compressor and simultaneously forces air rearwardly through the annular space 24 which surrounds the compressor housing 23 in the engine 11.

In accordance with the present invention, fan bypass air from the annular space 24 is bled off through the conduit 20 near the front of the engine and engine compressor where the air is comparatively cool. A means for diverting fan bypass air into each bleed-off duct 20 constitutes an important part of the invention and includes the following.

A flexible metal strip 25 of steel or titanium is normally flat when in a relaxed state and has a length capable of forming one complete spiral convolution in the annular air passage 24 between a point A immediately upstream from the bleed-off duct 20 and a point B immediately downstream therefrom, FIG. 3. The strip 25 is resilient and can be deformed but will return by elastic memory to a normal flat state. The width of the strip 25 is such that, when in the active position, FIGS. 3 and 6, the shaped strip can extend radially inwardly from the outer engine housing 21 close to the housing 23 of the compressor so that all of the fan bypass air can be forcibly diverted by the concave helical strip into the bleed-off conduit 20.

To accomplish this, each engine 11 contains within the space 24 a system of spaced rigid arcuate guides 26 for the resilient strip 25 slidably engaging the latter and having the ability to impart to the strip 25 a concave cross sectional shape as shown in FIG. 6 whenever the strip is forced through the guides 26 by suitable actuator means, such as a series of hydraulic cylinders 27 within the hollow space 28 between the walls of engine housing 21 and fixed therein. The rod 29 of each cylinder 27 is coupled as at 30 with a lug 31 provided on the diverter strip or element 25, several such lugs being provided to connect the strip 25 at several spaced points to the rods 29 of several cylinders 27 which are operated in unison by conventional control means, not shown.

As shown in FIG. 7, when cylinder rods 29 are retracted, the bypass air diverter element 25 is pulled back into the hollow wall space 28 of the engine housing and returns to a flat state therein. The annular space around the compressor housing 23 is now wide open so that the bypass air generated by the engine fan 22 can flow rearwardly and surround the gaseous stream being exhausted by the gas turbine to suppress noise and diminish turbulence at the rear of the engine.

The diverted bypass air passes through the branch ducts 19 and common delivery duct 18 to the two wing ducts 14 to operate the wing lift augmentation arrangement in U.S. Pat. No. 4,117,995, as described in that patent.

FIG. 8 shows a modification of the bypass air diverter means above-described. In lieu of the sliding diverter strip or vane 25 and its guides 26, a normally flat resilient diverter vane 32 lies in coplanar relationship with the interior wall 33 of engine housing 21. A pivoted operator 34 attached at 35 to the rod of a power cylinder 36 in housing space 28 can swing the pivoted operator 34 on its pivot 37 to an active position where the element 32 is flexed to the arcuate form shown in FIG. 8 and functions in the same manner as the diverter strip 25 for diverting all of the fan bypass air flowing around compressor housing 23 to the bleed-off duct 20. Like the element 25, the element 32, when in the active position shown in cross section in FIG. 8, extends spirally for one convolution in the annular passage 24 of the engine between the points A and B shown in FIG. 3. A suitable number of pivoted operator s 34 and cylinders 36 are provided around the circumference of the housing 21 to properly deploy the diverter 32 in its spiral concave form for use.

The delivery system for bypass air above-described is simple and reliable in operation. The design makes use of the cooler zone in the bypass air flowing through the annular passage 24 and also simplifies engine-to-wing construction compared to systems where air is bled off near the rear comparatively hotter end of the engine. The advantages of the invention will be recognized by those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a fixed wing aircraft, at least one fan jet engine having a housing and a fan bypass air passage within the housing in surrounding relationship to an engine compressor and turbine, a bypass air bleed-off conduit coupled in said housing and communicating with said passage and adapted to conduct fan bypass air to a wing lift augmentation system of the aircraft, and a fan bypass air shunting device on the engine housing and being movable to an active position within said passage near said bleed-off conduit and to an inactive position substantially outside of said passage, and an actuator means for said shunting device, said shunting device comprising a normally flat metallic strip coupled to said actuator means to be moved thereby, and coacting spaced relatively stationary guide devices for said strip within said passage and attached to said housing, said guide devices adapted to shape said strip into a helix of approximately one convolution within said passage and to impart to the strip an arcuate configuration at all points on the circumference of the strip, whereby the strip will act as an air scoop in said passage to shunt fan bypass air into said bleed-off conduit.

2. In a fixed wing aircraft as defined in claim 1, and said helix of approximately one convolution within said passage including spaced portions which straddle the mouth of said bleed-off conduit.

3. In a fixed wing aircraft as defined in claim 2, and said actuator means including a linear actuator for said strip and coupled with the strip on a movement axis across the longitudinal axis of the strip near one longitudinal edge of the strip.

* * * * *